No. 729,130. Patented May 26, 1903.

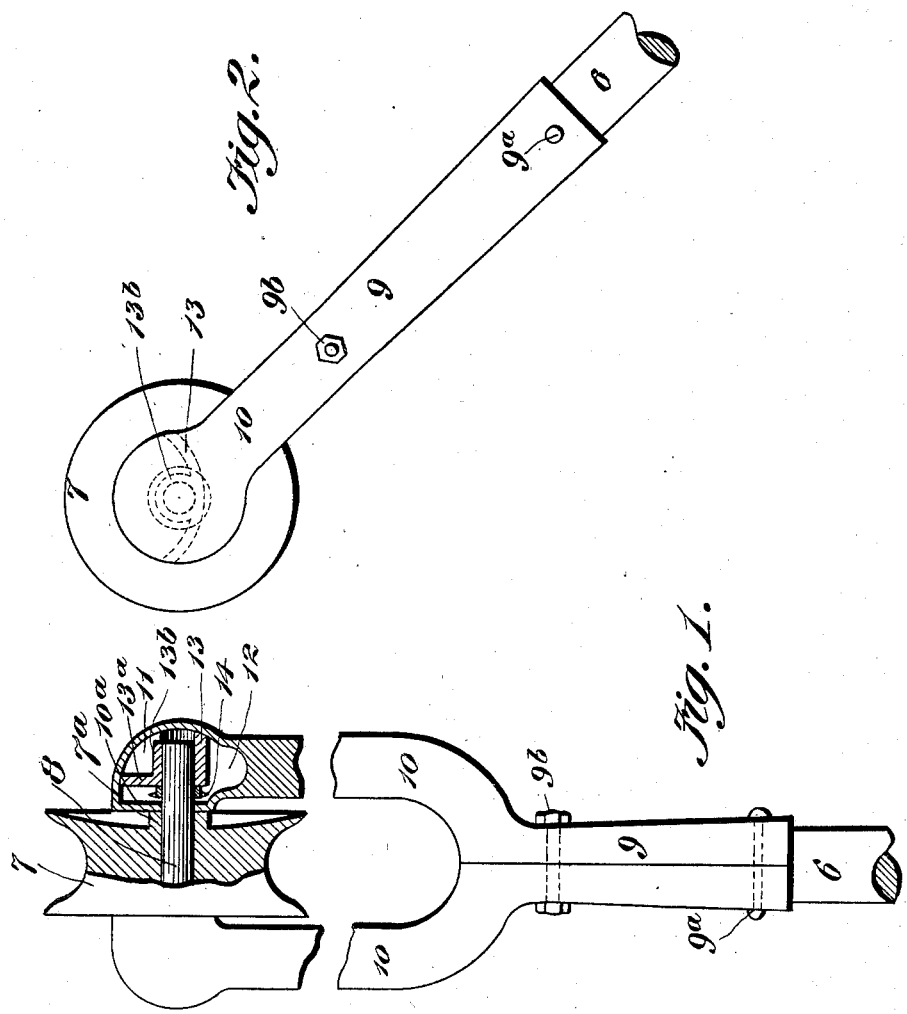

UNITED STATES PATENT OFFICE.

GEORGE E. CHAPMAN, OF CLEVELAND, OHIO.

TROLLEY-WHEEL BEARING.

SPECIFICATION forming part of Letters Patent No. 729,130, dated May 26, 1903.

Application filed October 29, 1902. Serial No. 129,242. (No model.)

*To all whom it may concern:*

Be it known that I, GEORGE E. CHAPMAN, a citizen of the United States, residing at Cleveland, in the county of Cuyahoga and State of Ohio, have invented certain new and useful Improvements in Trolley-Wheel Bearings; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to lubricating trolley-wheel bearings, and has for its object the formation of a simple and effective bearing in which the axle is supported in an oil-chamber, feeding oil along the axle to a well or chamber for spent oil below the bearing.

A further object is to prevent leak of the oil out of the oil-chambers.

As applied to trolley-wheels the invention comprises a bearing suspended within a casing formed at the end of each arm of the trolley-harp, the wheel being fixed to a shaft which extends through the inner wall of the casing into the bearings.

Referring specifically to the drawings forming a part of this application, Figure 1 is a sectional view, partly in elevation, of a trolley-head provided with my improvement. Fig. 2 is a side elevation thereof.

In the drawings, 6 indicates the trolley-pole, 7 the wheel, and 8 the shaft to which the wheel is fixed. The harp-socket 9 is preferably split lengthwise, as shown, and is held on the pole by a rivet $9^a$ and bolt $9^b$. The arms of the socket are indicated at 10, and they are enlarged at the ends and recessed to contain the bearings and the oil-chambers. The inner walls $10^a$ of the recesses are in conducting contact with the hub $7^a$ of the wheel. The oil-chambers are indicated at 11 and 12 for fresh and waste oil, respectively. These chambers are formed by the walls of the casing and a partition 13, which extends from the outer wall of the casing, substantially horizontally across the recess nearly to the inner wall of the casing, whence it extends vertically, as at $13^a$, to the top of the casing. The end of the shaft extends through the vertical part of the partition and finds its bearing on the horizontal part thereof, in a cylindrical box $13^b$, produced on the partition for that purpose. This box extends short of the outer wall of the casing. Hence it is open at the end to the inward flow of oil from the fresh-oil chamber. The oil so flowing through the bearing according to the requirements thereof finds its way out of the other end of the box and drops into waste-well 12. The centrifugal ring 14 on the shaft, between the inner end of the box and the inner wall of the casing, prevents leak of oil through the shaft-hole.

The simplicity of construction of this bearing is apparent, and as the box communicates directly at its end with the oil-chamber a full supply of oil is assured. The horizontal portion of the partition is dished toward the box, as shown in dotted lines in Fig. 2, so that the oil will flow to the box to the last drops.

What I claim as new, and desire to secure by Letters Patent, is—

1. The combination with a harp having recessed arms, and the wheel and its shaft, of a partition across the recess of each arm, forming upper and lower oil-chambers, and a bearing-box for the shaft, on the partition, spaced from the wall of the casing.

2. The combination with the axle and the bearing for the same, of a casing inclosing the bearing, and a partition across the casing supporting the bearing and forming upper and lower oil-chambers communicating with opposite ends of the bearing, respectively.

3. The combination with a casing, of an axle the end of which extends into the casing, a bearing for the axle within the casing, a partition supporting the bearing and dividing the casing into two oil-chambers communicating respectively with opposite ends of the bearing, and a centrifugal oil-ring on the shaft between the bearing and the casing.

In testimony whereof I affix my signature in presence of two witnesses.

GEORGE E. CHAPMAN.

Witnesses:
JOHN A. BOMMHARDT,
LOTTIE NEWBURN.